(12) United States Patent
Caliendo et al.

(10) Patent No.: US 9,233,332 B2
(45) Date of Patent: Jan. 12, 2016

(54) AIR FILTER ASSEMBLY FILLING PLENUM INTERIOR SPACE

(71) Applicant: Caterpillar Inc., Peoria, IL (US)

(72) Inventors: Vincent P. Caliendo, Peoria, IL (US); Mark T. Allott, Mapleton, IL (US); Bryant Morris, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 43 days.

(21) Appl. No.: 14/293,052

(22) Filed: Jun. 2, 2014

(65) Prior Publication Data

US 2015/0343358 A1 Dec. 3, 2015

(51) Int. Cl.
| | |
|---|---|
| *B01D 46/00* | (2006.01) |
| *B01D 46/10* | (2006.01) |
| *F02M 35/024* | (2006.01) |
| *B01D 46/52* | (2006.01) |

(52) U.S. Cl.
CPC ............ *B01D 46/0005* (2013.01); *B01D 46/10* (2013.01); *B01D 46/521* (2013.01); *F02M 35/02416* (2013.01); *B01D 2275/206* (2013.01)

(58) Field of Classification Search
CPC .. B01D 46/0005; B01D 46/10; B01D 46/521; B01D 2275/20; B01D 2275/206; F02M 35/02416; F02M 35/02475; F02M 35/02491
See application file for complete search history.

(56) References Cited

U.S. PATENT DOCUMENTS

| | | | |
|---|---|---|---|
| 4,925,561 A | 5/1990 | Ishii et al. | |
| 5,417,727 A | 5/1995 | Bowen et al. | |
| 5,902,365 A | 5/1999 | Haggard | |
| 7,311,747 B2 | 12/2007 | Adamek et al. | |
| 2013/0232933 A1 | 9/2013 | Haider et al. | |
| 2014/0014572 A1 | 1/2014 | Mbadinga-Mouanda et al. | |
| 2015/0007732 A1* | 1/2015 | Hasenfratz | B01D 46/522 96/134 |

FOREIGN PATENT DOCUMENTS

| | | |
|---|---|---|
| DE | 10 2010 032295 A1 | 1/2012 |
| DE | 10 2012 000470 A1 | 7/2013 |
| WO | WO 2012/013647 A1 | 2/2012 |
| WO | WO 2013/139992 A1 | 9/2013 |

* cited by examiner

*Primary Examiner* — Robert Clemente
(74) *Attorney, Agent, or Firm* — Leydig, Voit & Mayer, Ltd.

(57) ABSTRACT

An air filter assembly for use with a plenum having an internal passage with a non-linear configuration comprising is provided. The air filter assembly includes a support assembly including a neck portion that is insertable into the internal passage in the plenum and a mounting face. The air filter assembly includes an air filter with a filter frame supporting a filter media. The filter frame has an annular mounting flange extending around a perimeter of an inlet side of the filter which is configured to be releasably connectable to the mounting face of the support assembly. An outlet side of the filter includes a plurality of planar sections that extend at non-90° angles relative to each other and that are configured to be complementary to the internal passage of the plenum.

20 Claims, 5 Drawing Sheets

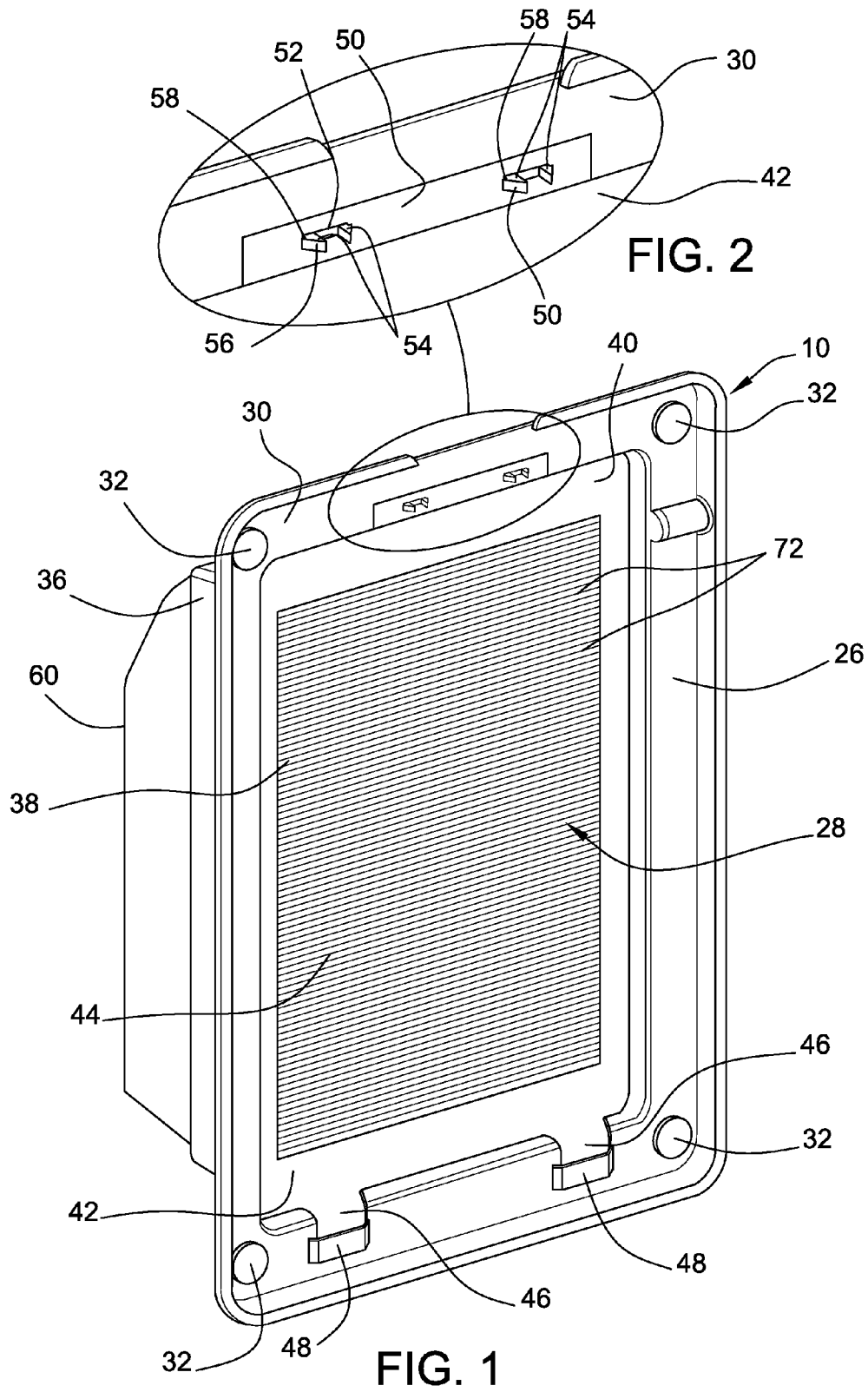

AIR FILTER ASSEMBLY FILLING PLENUM INTERIOR SPACE

TECHNICAL FIELD

This patent disclosure relates generally to air filter assemblies and, more particularly, to filter assemblies associated with air plenums.

BACKGROUND

The heating, ventilation and air conditioning (HVAC) system of a machine such as used in construction, mining and farming industries have a fresh air inlet plenum that is used to route fresh air into the HVAC system. This plenum typically has a panel filter arranged to extend across the front of the plenum. Typically, the panel filter is made of filter media that is semi-permeable to air flow allowing air to pass while removing the contaminants. Thus, the panel filter for the fresh air plenum helps prevent contaminants such as dirt, dust and/or other fine solids from the air being drawn into the HVAC system. The filter media may include layers of pleated paper that are held in place by a complementary-shaped housing that also can be used to help hold the filter in place at the front of the plenum.

Over time, dirt and other contaminates will collect on the filter media clogging the fresh air filter and resisting or preventing intake air from passing through the air cleaner arrangement and into the air inlet plenum. Accordingly, it is necessary to periodically replace the fresh air filter with a new filter or to remove and clean the filter. A machine typically has a variety of different types of filters, all of which must be serviced or replaced on a periodic basis. Unfortunately, the fresh air filter can require replacement more often than other machine filters such as those associated with the engine air, oil and hydraulic fluid. If the machine has to be serviced separately for replacement of the fresh air filter, machine downtime can increase.

SUMMARY

In one aspect, the disclosure describes an air filter assembly for use with a plenum having an internal passage with a non-linear configuration comprising. The air filter assembly includes a support assembly having a neck portion that is insertable into the internal passage in the plenum and a mounting face. The filter assembly further includes an air filter including a filter frame supporting a filter media. The filter frame has an annular mounting flange extending around a perimeter of an inlet side of the filter. The annular mounting flange is configured to be releasably connectable to the mounting face of the support assembly. An outlet side of the filter includes a plurality of planar sections that extend at non-90° angles relative to each other that are configured to be complementary to the internal passage of the plenum.

In another aspect, the disclosure describes an air handling system including a plenum having an internal passage with a non-linear configuration and an air filter assembly connected to an inlet opening of the plenum. The air filter assembly including a support assembly including a neck portion that is insertable into the internal passage in the plenum and a mounting face. The air filter assembly further including an air filter including a filter frame supporting a filter media. The filter frame has an annular mounting flange extending around a perimeter of an inlet side of the filter. The annular mounting flange is configured to be releasably connectable to the mounting face of the support assembly. An outlet side of the filter includes a plurality of planar sections that extend at non-90° angles relative to each other that are configured to be complementary to the internal passage of the plenum.

In yet another aspect, the disclosure describes an air filter including a pleated filter media and a filter frame supporting the filter media. The filter frame has an annular mounting flange extending around a perimeter of an inlet side of the filter media. The mounting flange includes a plurality of mounting apertures adjacent a first edge of the mounting flange and a plurality of mounting hooks adjacent a second edge that opposes the first edge. An outlet side of the filter media includes a first planar section that extends in perpendicular relation to a plane defined by the inlet side of the filter media, a second section that intersects the first section and extends at a non-90° angle relative to the first section and a third section that intersects the second section and extends at a non-90° angle relative to the second section. The third section extends in parallel to the plane defined by the inlet side of the filter media and has a smaller surface area than the inlet side of the filter media.

BRIEF DESCRIPTION OF THE DRAWINGS

FIG. 1 is a schematic, front perspective view of an air filter assembly according to the present disclosure.

FIG. 2 is a schematic, enlarged front perspective detail view of a retention mechanism of the air filer assembly of FIG. 1.

DETAILED DESCRIPTION

This disclosure generally relates to an air filter assembly for use with an air plenum. With particular reference to FIG. 1, an exemplary embodiment of a filter assembly 10 is shown. The filter assembly 10 of FIG. 1 can be configured to filter air from the environment for use in an application that requires clean air. For example, the air filter assembly 10 can be used to filter the supply air of fresh air to an air circulation system, for example a heating, ventilation and/or air conditioning (HVAC) system, of a machine. The HVAC system may be provided on machines that are intended to perform some type of operation associated with an industry such as mining, construction, farming, transportation, or any other industry known in the art. For example, the machine may be a vehicle such as a tractor-trailer rig, an earth-moving machine, such as a wheel loader, excavator, dump truck, backhoe, motor grader, material handler or the like.

While aspects of the air filter assembly 10 of the present disclosure may be described in connection with use in filtering fresh supply air to a HVAC system of a machine, the present disclosure is not limited to that particular application. Rather, the present disclosure can be applied to any application that requires a source of clean air.

Figure 5:
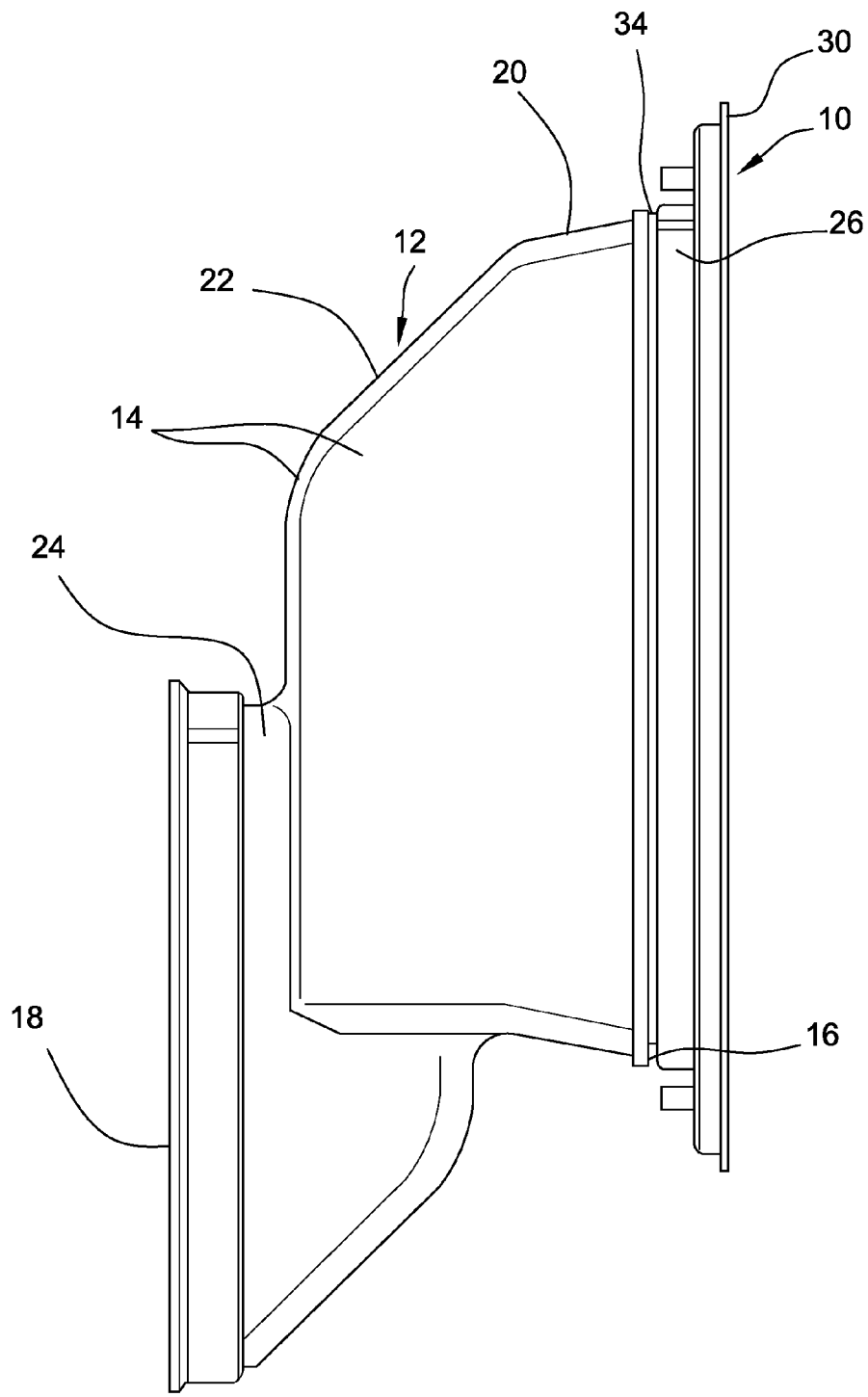
FIG. 5 is a schematic, side elevation view of the air filter assembly of FIG. 1 mounted in an air plenum.
Figure 6:
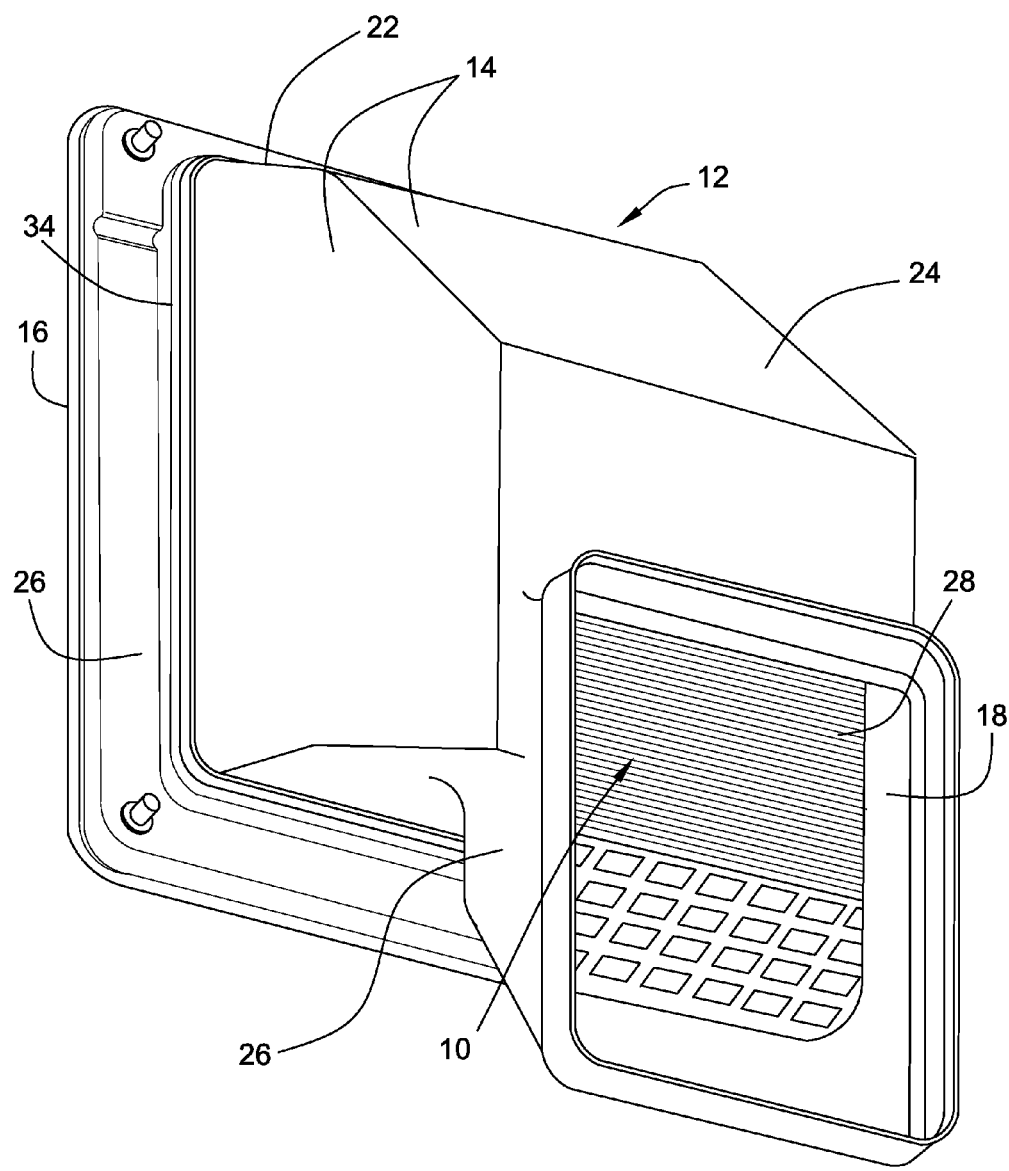
FIG. 6 is a schematic, rear elevation view of the air filter assembly of FIG. 1 mounted in an air plenum.

An exemplary plenum 12 for an air handling system with which the illustrated air filter assembly 10 can be used is shown in FIGS. 5 and 6. The illustrated plenum 12 can be configured to direct or guide fresh air into the HVAC system. In this regard, the plenum 12 may draw fresh air from any suitable source, such as, for example, the cabin of the machine or the outside air. The illustrated plenum 12 includes a plurality of side walls 14 that define an inlet opening 16 that communicates with an internal passage 18 through which air drawn into the plenum 12 can be directed, for example, to the HVAC system. As best shown in FIG. 5, the side walls 14 of the plenum may be configured such that the internal passage 18 of the plenum 12 has a non-linear or contoured configuration. In particular, at least one side wall 14 of the plenum 12 may be configured so as to define a portion of an interior wall of the plenum 12 that extends in a non-perpendicular manner with respect to a plane defined by the inlet opening 16 of the plenum. As shown in FIGS. 5 and 6, the plenum 12 may include a generally straight inlet section 20 that is followed in a downstream direction by an intermediate section 22 in which the upper side wall 14 of the plenum 12 extends at a non-90° angle relative to the inlet section 20 and the plane of the inlet opening 16 of the plenum. As a result of this configuration, the intermediate section 22 of the plenum 12 can communicate with a plenum outlet section 24 that may be laterally offset with respect to the inlet opening 16 and inlet section 20 of the plenum 12 as shown in FIG. 5.

For removing contaminants such as dust or other fine particles from the air being drawn into the plenum 12 and thus into the HVAC system or other associated application, the air filter assembly 10 may be arranged at the inlet opening 16 of the plenum 12 as shown in FIG. 5. To support the filter and facilitate mounting of the air filter assembly 10 to the inlet opening 16 of the plenum 12, the air filter assembly 10 may include a support assembly 26 that may be configured to receive and accommodate a filter 28 as shown in FIG. 2. In particular, the support assembly 26 may include an annular outer mounting face 30 that defines an opening through which the filter 28 may be inserted. The mounting face 30 may include fasteners 32, such as at each corner of the annular mounting face, to facilitate connection of the support assembly 26 to a structure surrounding the inlet opening 16 to the plenum.

Figure 3:
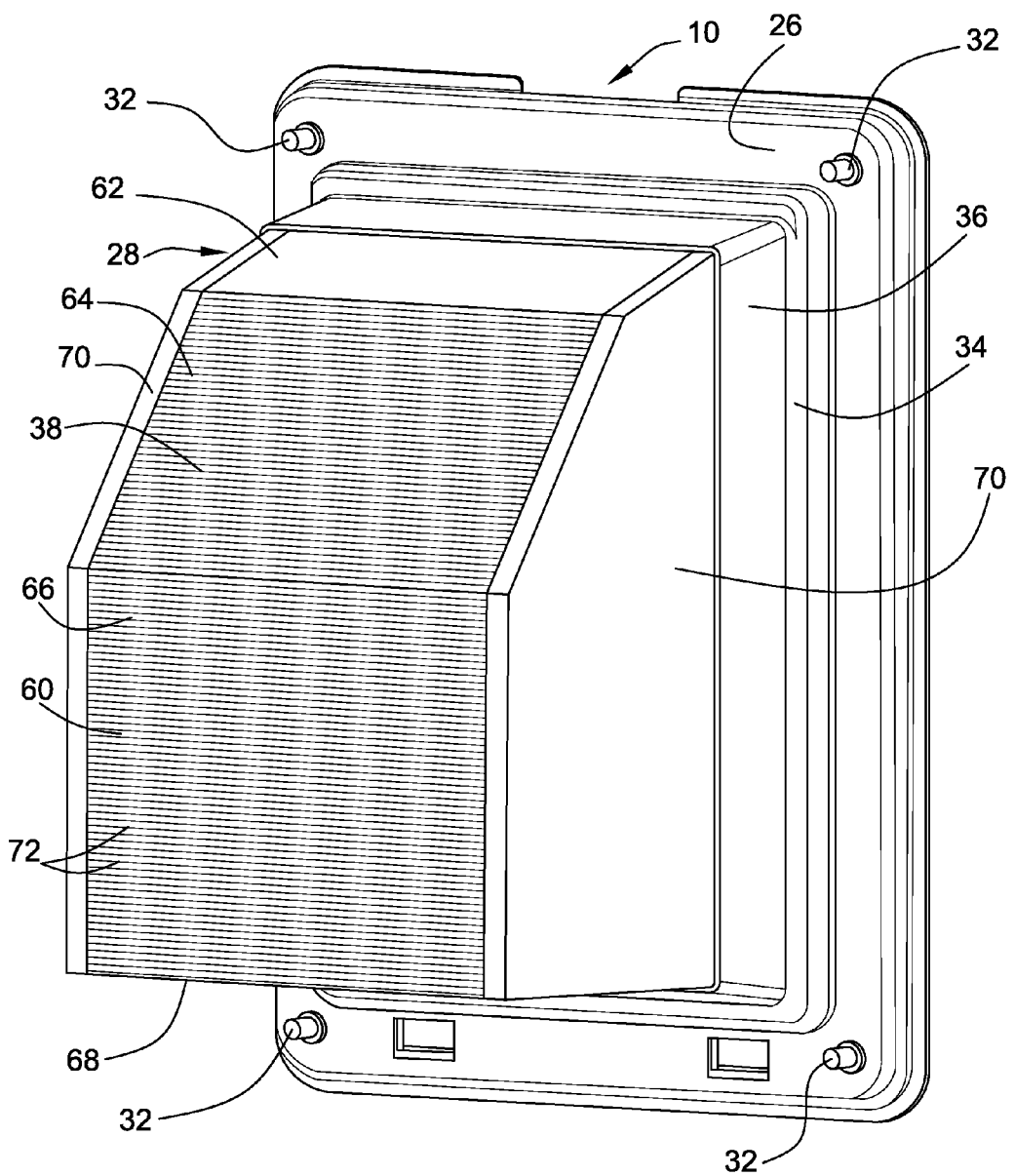
FIG. 3 is a schematic, rear perspective view of the air filter assembly of FIG. 1.

As shown in FIG. 3, the support assembly 26 may further include an annular shoulder 34 that depends from the mounting face 30 adjacent an inside edge thereof and extends in an axially inward direction relative to the mounting face 30 (which is also the downstream direction relative to the plenum 12 and filter assembly 10). The support assembly 26 may also include a neck portion 36 that depends from the shoulder 34 and also extends in an axially inward or downstream direction. When the support assembly 26 is connected to the plenum 12, the shoulder 34 abuts against the edge of the plenum inlet opening 16 and the neck portion 36 extends into the internal passage 18 of plenum 12 and abuts against the inner wall. To enhance sealing of the support assembly 26 against the plenum 12, and thereby ensure that air drawn into the plenum 12 travels through the filter 28, foam strips may be provided to seal any leak paths between the filter 28 and the plenum 12.

The filter 28 of the air filter assembly 10 may include a filter media 38 that is supported by a filter frame 40. To facilitate connection of the filter 28 to the support assembly 26, the filter frame 40 may include an annular mounting flange 42 at an inlet side 44 of the filter 28 as shown in FIG. 1. The mounting flange 42 of the filter frame 40 may extend around the perimeter of the inlet side 44 of the filter leaving the filter media 38 at the center portion of the inlet side of the filter 28 substantially unobstructed. For connecting the filter 28 to the support assembly 26, and thereby to the plenum 12, the mounting flange 42 of the filter frame 40 may include one or more mounting hooks 46, in the case of the illustrated embodiment depending from a lower edge of the mounting flange 42, that may be releasably engageable with complementary pockets 48 in the mounting face of the support assembly 26. The pockets 48 may be configured with an open back portion that allows the mounting hooks 46 to be first brought into engagement with the pockets 48 with the filter 28 at an angle relative to the mounting face 30 of the support assembly 26. Once the hooked portions 46 are inserted in the pockets 48, the filter 28 can then be pivoted into engagement with the mounting face 30 of the support assembly 26.

At an upper edge of the mounting flange 42, an upwardly extending portion 50 having a plurality, in this case a pair, of mounting apertures 52 may be provided as shown in FIG. 2. To facilitate connection of the upper edge of the filter 28 to the support assembly 26, each of the mounting apertures 52 may be configured to be releasable engageable with a corresponding pair of spring tabs 54 arranged adjacent an upper edge of the mounting face 30 of the support assembly 26. Each pair of spring tabs 54 may extend outward from the mounting face 30 of the support assembly 26 and be configured such that they can be deflected resiliently in an inward direction toward each other as they are inserted through the corresponding aperture 52 on the mounting flange 42 of the filter frame 40. To assist that deflection, each spring tab 54 can have a ramped portion 56 that engages with an edge of the mounting aperture 52 and produces a camming action that forces the spring tabs 54 inward toward each other. Once the ramped portions 56 of the tabs 54 are inserted fully through the corresponding mounting aperture 52, the spring tabs 54 spring resiliently back to their original position so as to bring a locking ledge 58 on each tab 54 into engagement with the outer surface of the filter frame mounting flange 42 thereby locking the upper edge of the filter 28 to the support assembly 26. In this position, the lower edge of the filter 28 is secured to the support assembly 26 by the mounting hooks 46 of the filter frame 40 being captured in the corresponding pockets 48 on the support assembly 26. While the air filter assembly 10 is described in connection with a particular arrangement for retaining the filter 28 to the support assembly 26 and the plenum 12, it will be understood that other arrangements could also be used.

To provide the filter 28 with additional surface area that can be used to remove contaminants as compared to a flat panel filter extending across the opening to the plenum, the filter 28 may be configured such that an outlet side 60 of the filter is contoured in a manner that is complementary to the configuration of the internal passage 18 of the plenum 12. As shown for example, in FIG. 1, the inlet side 44 of the filter (the side through which air is initially drawn into the filter) may be configured so as to extend primarily in a single plane defined by the tips of the folds in the filter material. The outlet side 60 of the air filter (the side through which air may exit the filter) may have a contour that is defined by a plurality of planar outlet side sections that intersect one another at angles other than 90°. As a result of this configuration, the cross-sectional area of the filter 28 decreases as it extends from the inlet side 44 to the outlet side 60.

Figure 4:
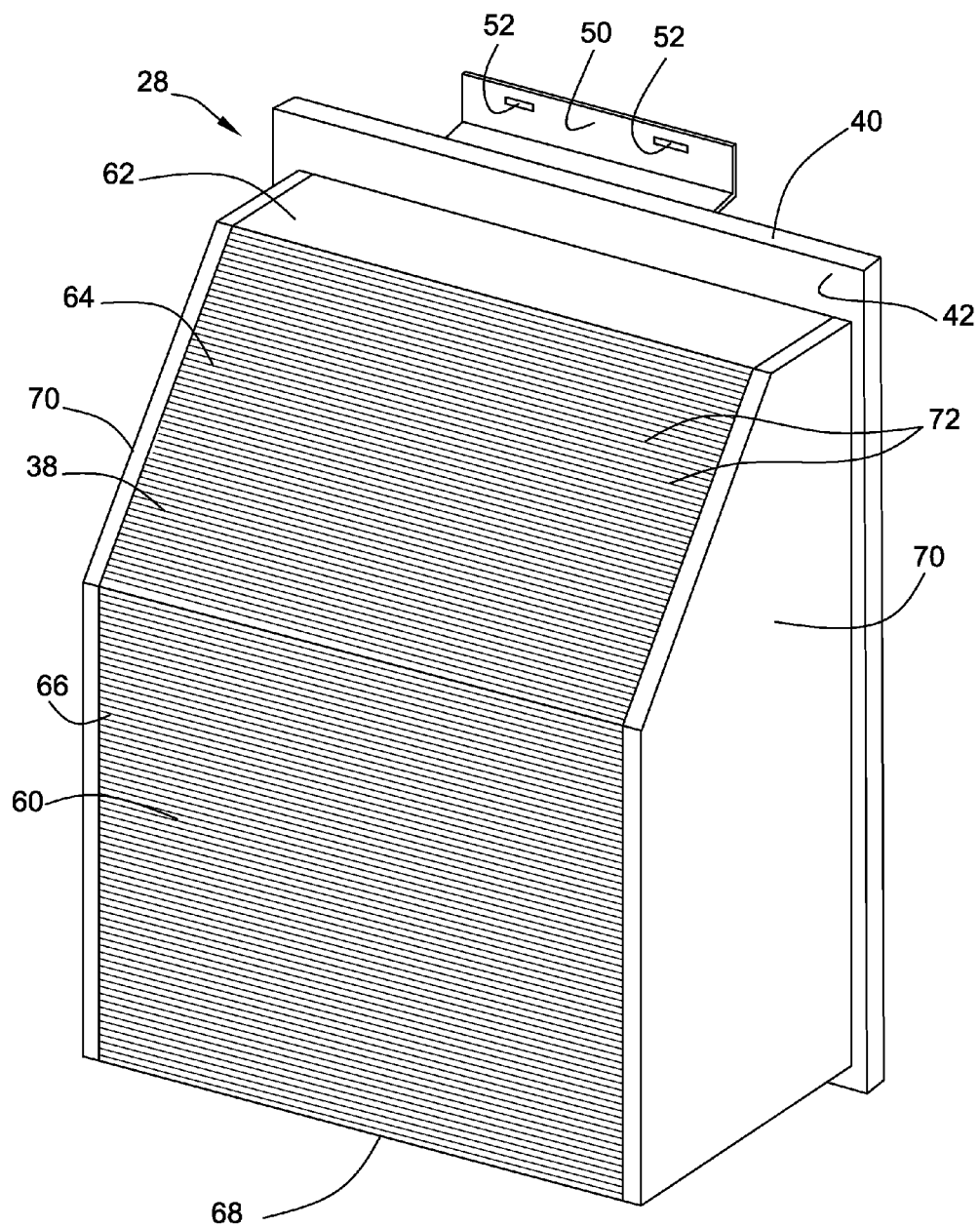
FIG. 4 is a schematic, rear perspective view of the filter of the air filter assembly of FIG. 1.

As shown in FIGS. 3 and 4, these outlet side sections may include an upper first section 62 extending in perpendicular relation to the plane defined by the inlet side 44 of the filter 28. The outlet side sections may further include an angled second section 64 that extends away from the first upper section 62 at an angle of other than 90° (e.g., the angle between the respective planes in which the first section 62 and the second section 64 extend, as measured around the line in which the planes intersect, is other than 90°). In the illustrated embodiment, the angled second section 64 angles downward in a complementary manner to the angled intermediate section 22 of the plenum 12. Throughout the angled second section 64, the cross-sectional area of filter 28 decreases continuously as the second section 64 extends in the downstream direction (i.e. the direction starting from the inlet side and heading to the outlet side of the filter). A third section 66 of the outlet side may intersect the second section 64 at an angle of other than 90° (e.g., the angle between the respective planes in which the second section 64 and the third section 66 extend, as measured around the line in which the planes intersect, is other than 90°). The third section 66 also extends in parallel relation to the plane defined by the inlet side 44 of the filter 26. A lower fourth section 68 of the outlet side may extend between the third section 66 and the inlet side 44 and extend perpendicularly relative to both. In the illustrated embodiment, the third section 66 of the outlet side 60 of the filter 28 is smaller in surface area than the inlet side 44 of the filter 28. Additionally, the upper first section 62 may be smaller in surface area than the angled second section 64 and the third section 66.

As shown in FIGS. 3 and 4, the filter frame 40 may include lateral side panels 70 that extend over and support the lateral sides of the filter media 38, which may extend perpendicularly relative to the inlet side 44 of the filter 28. Additionally, the filter frame 40 may be configured such that the first, second, third and fourth sections 62, 64, 66, 68 of the outlet side 60 are substantially open such that air may exit the filter media 38 and into the plenum 12. To this end, the filter frame 40 may not have any structure extending over those outlet side sections or it may have a substantially open cage-like structure that provides support to the filter media 38 while still providing a minimal obstruction to the flow of air out of the filter media 38.

The filter media 38 can be made from an air or gas permeable material such as, for example, paper-based materials including paper pulp, a cellulose material, spun polyester, organic or glass fibers, sintered materials, or other filter materials. Additionally, the filter media 38 can be assembled in one or more sheet-like layers that can be folded into a plurality of longitudinal pleats 72 as commonly done with filter materials. The plurality of pleats 72 can be generally parallel and adjacent to each other and provide channels or flutes within the fold of the pleats that facilitate the passage of air through the filter media 38. The filter media 38 can be arranged so that the pleats 72 extend generally between the inlet side and the second and third sections 64, 66 of the outlet side 60 of the filter 28 (and vice versa).

Typical filter media generally cannot be easily bent into a shape in which the outlet side of the filter is contoured in a manner complementary of to the configuration of the inside the plenum. However, filter media marketed by Mann+Hummel under the tradename VarioPleat may be used as it provides for the use of variable pleat height that allows large pleat steps as well as smooth transitions in which the pleat height increases or decreases continuously thereby allowing the filter to have a stepped or angled configuration.

INDUSTRIAL APPLICABILITY

The present disclosure is applicable to any application involving filtering air drawn into a plenum that has a non-linear configuration. As noted previously, one exemplary application for the air filter assembly 10 of the present disclosure is filtering air drawn into the fresh air inlet plenum for a HVAC system of a machine. The contouring the outlet side of the filter to be complementary to the internal configuration of the plenum allows the filter to take advantage of previously unused space inside the plenum. Moreover, the configuration of the disclosed filter increases the surface area of the filter media as compared to the panel filters previously used in such applications. This increased surface area can lengthen the usable life of the filter and make its regular service interval the same as the other machine filters. Thus, the disclosed filter assembly 10 can reduce machine downtime by eliminating the need for separate service stops for the air filter.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An air filter assembly for use with a plenum having an internal passage with a non-linear configuration, the air filter assembly comprising:
   a support assembly including a neck portion that is insertable into the internal passage in the plenum and a mounting face; and
   an air filter including a filter frame supporting a filter media, the filter frame having an annular mounting flange extending around a perimeter of an inlet side of the filter, the annular mounting flange being configured to be releasably connectable to the mounting face of the support assembly, an outlet side of the filter including a plurality of planar sections that extend at non-90° angles relative to each other that are configured to be complementary to the internal passage of the plenum.

2. The air filter assembly of claim 1 wherein the plurality of planar sections of the outlet side of the filter media includes a first planar section that extends in perpendicular relation to a plane defined by the inlet side of the filter media, a second section that intersects the first section and extends at a non-90° angle relative to the first section and a third section that intersects the second section and extends at a non-90° angle relative to the second section.

3. The air filter assembly of claim 2 wherein the third section extends in parallel to the plane defined by the inlet side of the filter media and has a smaller surface area than the inlet side of the filter media.

4. The air filter assembly of claim 2 wherein a cross-sectional area of the filter media decreases continuously as the second section extends toward the third section.

5. The air filter assembly of claim 1 wherein the mounting flange of the filter frame includes a plurality of mounting apertures adjacent a first edge of the mounting flange that are releasably engageable with a plurality of resilient spring tabs arranged adjacent a first edge of the mounting face of the support assembly.

6. The air filter assembly of claim 4 wherein the mounting flange of the filter frame includes a plurality of mounting hooks adjacent a second edge of the mounting flange that opposes the first edge and the mounting hooks being releasably engageable with a plurality of complementary pockets arranged adjacent a second edge of the mounting face of the support assembly that opposes the first edge of the mounting face of the support assembly.

7. The air filter assembly of claim 1 wherein the filter frame includes side panels that extend over opposing lateral sides of the filter media.

8. The air filter assembly of claim 1 wherein the filter media is pleated.

9. An air handling system, comprising:
 a plenum having an internal passage with a non-linear configuration; and
 an air filter assembly connected to an inlet opening of the plenum, the air filter assembly comprising:
  a support assembly including a neck portion that is insertable into the internal passage in the plenum and a mounting face; and
  an air filter including a filter frame supporting a filter media, the filter frame having an annular mounting flange extending around a perimeter of an inlet side of the filter, the annular mounting flange being configured to be releasably connectable to the mounting face of the support assembly, an outlet side of the filter including a plurality of planar sections that extend at non-90° angles relative to each other that are configured to be complementary to the internal passage of the plenum.

10. The air handling system of claim 9 wherein the plurality of planar sections of the outlet side of the filter media includes a first planar section that extends in perpendicular relation to a plane defined by the inlet side of the filter media, a second section that intersects the first section and extends at a non-90° angle relative to the first section and a third section that intersects the second section and extends at a non-90° angle relative to the second section.

11. The air handling system of claim 10 wherein the third section extends in parallel to the plane defined by the inlet side of the filter media and has a smaller surface area than the inlet side of the filter media.

12. The air handling system of claim 11 wherein a cross-sectional area of the filter media decreases continuously as the second section extends toward the third section.

13. The air handling system of claim 9 wherein the mounting flange of the filter frame includes a plurality of mounting apertures adjacent a first edge of the mounting flange that are releasably engageable with a plurality of resilient spring tabs arranged adjacent a first edge of the mounting face of the support assembly.

14. The air handling system of claim 13 wherein the mounting flange of the filter frame includes a plurality of mounting hooks adjacent a second edge of the mounting flange that opposes the first edge and the mounting hooks being releasably engageable with a plurality of complementary pockets arranged adjacent a second edge of the mounting face of the support assembly that opposes the first edge of the mounting face of the support assembly.

15. The air handling system of claim 9 wherein the filter frame includes side panels that extend over opposing lateral sides of the filter media.

16. The air handling system of claim 9 wherein the filter media is pleated.

17. The air handling system of claim 9 wherein the plenum includes a section that extends at a non-90° angle relative to a plane defined by the inlet opening of the plenum.

18. An air filter comprising:
 a pleated filter media; and
 a filter frame supporting the filter media, the filter frame having an annular mounting flange extending around a perimeter of an inlet side of the filter media, the mounting flange including a plurality of mounting apertures adjacent a first edge of the mounting flange and a plurality of mounting hooks adjacent a second edge that opposes the first edge;
 wherein an outlet side of the filter media includes a first planar section that extends in perpendicular relation to a plane defined by the inlet side of the filter media, a second section that intersects the first section and extends at a non-90° angle relative to the first section and a third section that intersects the second section and extends at a non-90° angle relative to the second section, the third section extending in parallel to the plane defined by the inlet side of the filter media and having a smaller surface area than the inlet side of the filter media.

19. The air filter of claim 18 wherein a cross-sectional area of the filter media decreases continuously as the second section extends toward the third section.

20. The air filter of claim 18 wherein the filter frame includes side panels that extend over opposing lateral sides of the filter media.

* * * * *